(12) United States Patent
Yalagandula et al.

(10) Patent No.: US 8,359,376 B1
(45) Date of Patent: Jan. 22, 2013

(54) PROACTIVE SENDING OF AN IP-TO-MAC ADDRESS BINDING FOR A HIGH FAN-IN NODE

(75) Inventors: Praveen Yalagandula, Redwood City, CA (US); Jayaram Mudigonda, San Jose, CA (US); Jeffrey Clifford Mogul, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 12/763,647

(22) Filed: Apr. 20, 2010

(51) Int. Cl.
*G06F 15/177* (2006.01)
*G06F 15/16* (2006.01)
*G06F 12/14* (2006.01)

(52) U.S. Cl. .............................. 709/221; 726/13; 726/23

(58) Field of Classification Search .................... 709/221
See application file for complete search history.

(56) References Cited

U.S. PATENT DOCUMENTS

| 7,490,351 | B1 * | 2/2009 | Caves et al. ..................... 726/13 |
| 7,551,559 | B1 * | 6/2009 | Jonnala et al. ................. 370/230 |
| 2007/0101429 | A1 * | 5/2007 | Wakumoto et al. ............. 726/23 |
| 2010/0272107 | A1 * | 10/2010 | Papp et al. ..................... 370/392 |

* cited by examiner

*Primary Examiner* — Wing F Chan
*Assistant Examiner* — David X Yi

(57) ABSTRACT

Proactive sending of an IP-to-MAC address binding for a node is performed if a node is determined to be a high fan-in node. If the node is determined to be a high fan-in node, the node periodically sends its IP-to-MAC address binding to nodes in a network. If the node is not determined to be a high fan-in node, the node sends its IP-to-MAC address binding in response to receiving a request for the node's IP-to-MAC address binding.

18 Claims, 3 Drawing Sheets

PROACTIVE SENDING OF AN IP-TO-MAC ADDRESS BINDING FOR A HIGH FAN-IN NODE

BACKGROUND

In a large Ethernet network, Address Resolution Protocol (ARP) traffic can get extremely high, inundating the network. ARP is used by nodes in a network to determine the Media Access Control (MAC) address of another node whose Internet Protocol (IP) address is known. For example, if a node needs to send a packet to a destination node, the MAC address of the destination node must be known and included in the Ethernet packet header for IP routing. If the MAC address is not known, the node floods the network with an ARP request, including the IP address that needs to be resolved to a corresponding MAC address. A node that receives the ARP request matches the IP address in the ARP request to its own IP address. If it matches, then the node forms an ARP reply packet including the IP-to-MAC address binding (i.e., both the IP address and the MAC address of the node corresponding to the IP address), and sends the ARP reply packet to the ARP request sender. Note that IP-to-MAC address bindings may change over time and also may become stale as is further described below.

ARP requests are also generated in situations where an IP-to-MAC address binding times out. Each node may cache IP-to-MAC address bindings that it has resolved in a local ARP table. A timestamp is maintained along with each binding. The timestamp denotes the last time at which the node received a packet that informed of the binding. To ensure that stale bindings are not used, any entry with a timestamp older than the "ARP-timeout" is considered unusable and is either deleted from the local ARP table or is marked as stale. Most LINUX kernels use a value of 30 seconds for this timeout. Some recent WINDOWS kernels use a timeout value that is randomly distributed, for example with a mean of 30 seconds, a minimum of 15 seconds, and a maximum of 45 seconds. If a packet needs to be sent to a destination IP address in a stale, or a non-existent entry, an ARP request is generated and broadcast over the entire network to re-resolve the IP-to-MAC address binding before sending.

As indicated by the situations described above, ARP traffic can potentially inundate a large Ethernet network, especially when there are situations where each node in the network needs to communicate with all other nodes or many other nodes in the network. This traffic can significantly reduce the amount of bandwidth available for applications in the network. As a result, the quality of service for applications, such as voice-over-IP, streaming video, or other large bandwidth or low latency applications, can be negatively impacted. Also, a large numbers of ARPs, i.e., ARP requests and replies, waste a significant amount of CPU time on nodes. Also, unnecessary ARPs can also increase flow-setup time, which especially may impact short flows, such as flows used for scientific applications.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

According to an embodiment, a node that knows an IP-to-MAC address binding proactively sends the binding to all or a set of nodes in the network. The proactive sending may include periodically sending bindings for nodes determined to be high fan-in nodes, which include nodes determined to have many requests for their IP-to-MAC address bindings. Fan-in may be the number of nodes trying to send packets to a particular machine simultaneously. The periodicity of sending the bindings may be more frequent than the timeouts, so less ARP requests are generated in response to stale entries in ARP tables. Also, high fan-in nodes, rather than all the nodes in the networks, proactively send or broadcast their IP-to-MAC address bindings to minimize overhead in the network.

A node that has an IP and MAC address and is operable to respond to a request for an IP-to-MAC binding may perform the proactive sending. A node is a device that is connectable to a network, and may include end user devices, such as personal computers, laptops, mobile phones, etc., or other types of devices such as servers, network switches, hubs, repeaters, etc.

Figure 1:
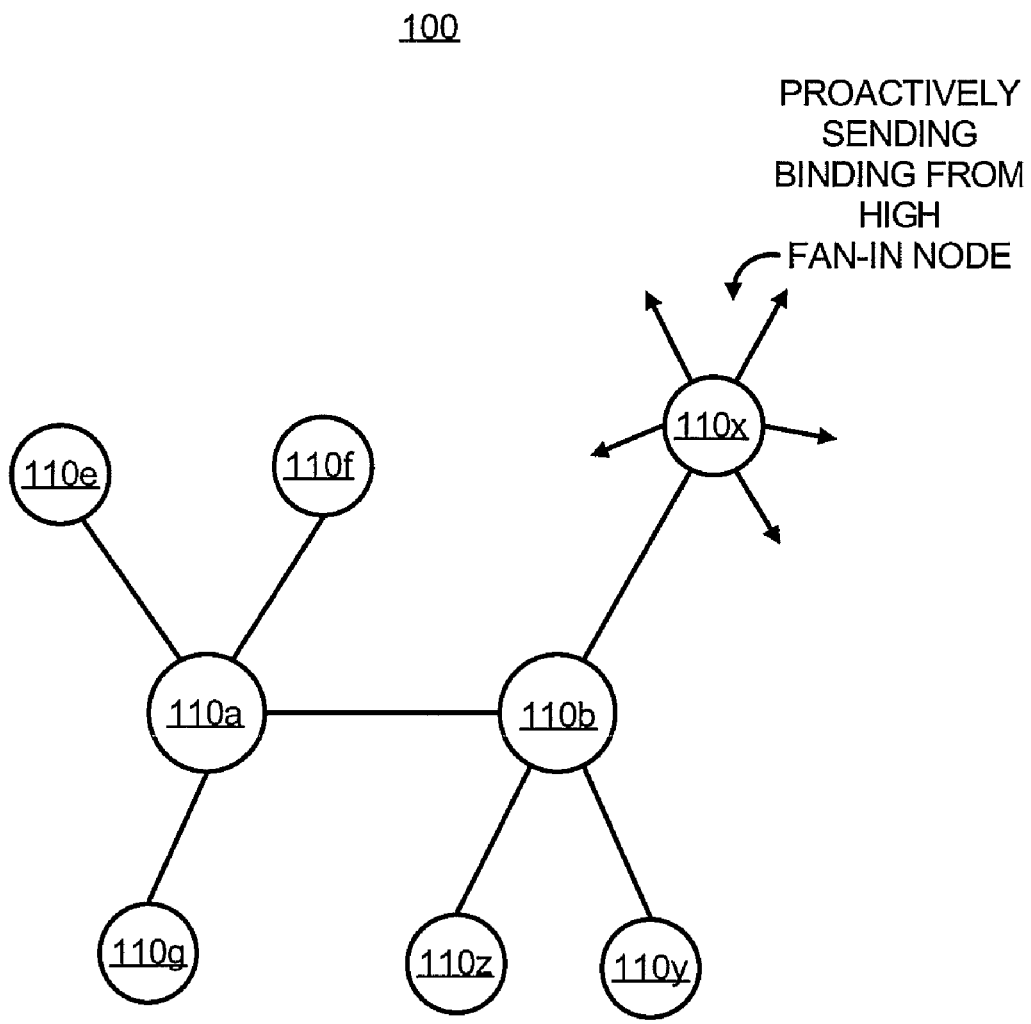
FIG. 1 illustrates a network showing high fan-in nodes and other nodes, according to an embodiment.

FIG. 1 illustrates a portion of a network 100. The network 100 includes nodes 110. The nodes 110 may include high fan-in nodes. Nodes 110a and 110b are switches and are referred to herein as switches. The network 100 may be in a layer 2 (L2) domain that routes using MAC addresses, and the switches 110a and 110b may be L2 switches that route using MAC addresses. Nodes 110e-g are connected to the network 100 via the switch 110a. Nodes 110x-z are connected to the network 100 via the switch 110b. It will be apparent to one of ordinary skill in the art that the network 100 may include more nodes than shown.

The node 110e may be running an application that needs to send data to the node 110x. The application knows the IP address of the node 110x but does not know the MAC address of the node 110x. The node 110e may determine the IP-to-MAC binding of the node 110x through conventional ARP techniques. For example, the node 110e broadcasts an ARP request in the network 100 for the IP-to-MAC binding of the node 110x. The node 110x receives the broadcast, and sends the binding to the node 110e. The node 110e then sends L2 packets to the node 110x via the switches 110a and 110b using the MAC address of the node 110x.

According to an embodiment, the node 110x may determine that it is a high fan-in node because it receives ARP requests at a rate greater than a threshold. The node 110x proactively and periodically sends its IP-to-MAC address binding after determining it is a high fan-in node. The node 110e and the other nodes in the network 100 receive the IP-to-MAC address binding of the node 110x. The node 110x and the other nodes store the binding in their tables or if the nodes already have an entry for the node 110x in their tables, they maintain the entry as valid rather than stale. Now, if the node 110e needs to send packets to the node 110x, the node 110e does not need to broadcast an ARP request for the IP-to-MAC address binding of the node 110x, because the node 110e received and stored the binding as a result of the proactive sending of the binding from the high fan-in node 110x.

An end host, such as a server, may be a high fan-in node. Other types of nodes may also be high fan-in nodes. For example, a gateway router is a node that may be a high fan-in node because of all the ARP requests it may receive from nodes using the gateway router to connect to the network.

According to an embodiment, a node determines whether it is a high fan-in node by comparing the number of requests received for the node's IP-to-MAC address binding with a threshold. Several examples of different types of thresholds are now described. The threshold may be the number of requests received within a predetermined period of time, i.e., a request rate. For example, the threshold is 30 requests within 20 seconds. If a node receives more than 30 requests for its IP-to-MAC address binding within a 20 second time period, then the node determines that it is a high fan-in node. Thresholds other than the rate described above may be used.

In another example, the threshold is based on the number of different nodes that send requests within a predetermined period of time. If that threshold is exceeded, then the node determines that it is a high fan-in node. In another example, the threshold may not be a rate but instead is a number of requests received for the node's IP-to-MAC address binding in total (or a fraction of the total) or a number of different nodes sending the requests in total (or a fraction of the total). A node can monitor for all ARP requests to get an estimate of the number of nodes in the network.

Periodicity for a high fan-in node is how often the node sends its IP-to-MAC address binding, via a so-called "Gratuitous ARP" broadcast (which may be sent as a multicast in some embodiments). The periodicity may be at a higher rate than a shortest timeout for nodes requesting the IP-to-MAC address binding of the high fan-in node. For example, each node has a timeout for stored IP-to-MAC address bindings. The timeout is a period of time a binding is considered valid. For example, if the timeout is 20 seconds, after 20 seconds the binding is considered stale and is resolved again, for example, by sending an ARP request. The high fan-in node determines timeouts for the nodes connected to the high fan-in node and may set the periodicity to be faster than the shortest timeout. For example, referring to FIG. 1, the node 110x determines the timeouts of nodes 110e-g and nodes 110y-z. The node 110x can monitor the rate of ARP requests from those nodes to infer each of their timeouts or can send a request to each of the nodes to determine their timeouts. In the case of nodes that use randomized values for their timeouts, the node 110e could use the minimum observed time between ARP requests from each of the nodes 110e-g and nodes 110y-z. In one example, the node 110e determines the timeouts to be 20, 20, 20, 30, and 30 seconds for the nodes 110e-g and nodes 110y-z, respectively. The shortest timeout is 20 seconds. The node 110e sets its periodicity to be faster than every 20 seconds. For example, the node 110e sets its periodicity to every 15 seconds and sends its IP-to-MAC address binding every 15 seconds so the binding for the node 110e does not become stale in the tables of the nodes 110e-g and nodes 110y-z. If there are multiple high fan-in nodes, each of the high fan-in nodes may send its IP-to-MAC address binding to other nodes in the network within a periodic time window, and each of the high fan-in nodes randomly selects a time in the time window to send its binding. The randomly-selected time during this time window could be chosen from a distribution that avoids sending IP-to-MAC address bindings too frequently, and that avoids the risk of synchronized bursts of sending binding messages.

A high fan-in node may be connected to many nodes and may have to adjust its periodicity according to many different timeouts. When determining the periodicity, the high fan-in node may ignore outliers, such as timeouts above or below a standard deviation, when identifying the shortest timeout. The number of outliers used may be based on the number of nodes in the network. In one embodiment, the periodicity is determined from the average of the timeouts rather than from the shortest timeout.

In another embodiment, the receiving node adjusts the timeout for its ARP table entry to be greater than the periodicity that it observes for the sending node. For example, the gateway node 110e has a periodicity of every 20 seconds for sending its IP-to-MAC address binding. The nodes 110e-g and nodes 110y-z determine the periodicity by monitoring the rate the IP-to-MAC address binding is received from the node 110e, or the node 110e may, with a minor change to the ARP protocol, send a signal to the nodes 110e-g and nodes 110y-z indicating the periodicity. The nodes 110e-g and nodes 110y-z then adjust their timeouts to be greater than the periodicity, e.g., a timeout of 30 seconds.

In another embodiment, nodes maintain two tables of bindings and timeouts. One table, referred to as the reactive table, includes binding and timeouts for nodes that reactively send their IP-to-MAC address bindings, and a second table, referred to as the proactive table, is for nodes that proactively send their IP-to-MAC address bindings. The proactive table may include high fan-in nodes that periodically send their bindings, and the reactive table may include nodes that send their binding, for example, only in response to receiving an ARP request for the binding. In one example, the timeouts for the nodes in the reactive table may be the same and based on a setting, such as 20 seconds. The timeouts for the nodes in the proactive table may be adjusted for each node based on the node's periodicity of sending its IP-to-MAC address binding. A node maintaining these two tables may occasionally need to move an entry from the proactive table to the reactive table, or from the reactive table to the proactive table, based on observations about the other node.

Figure 2:
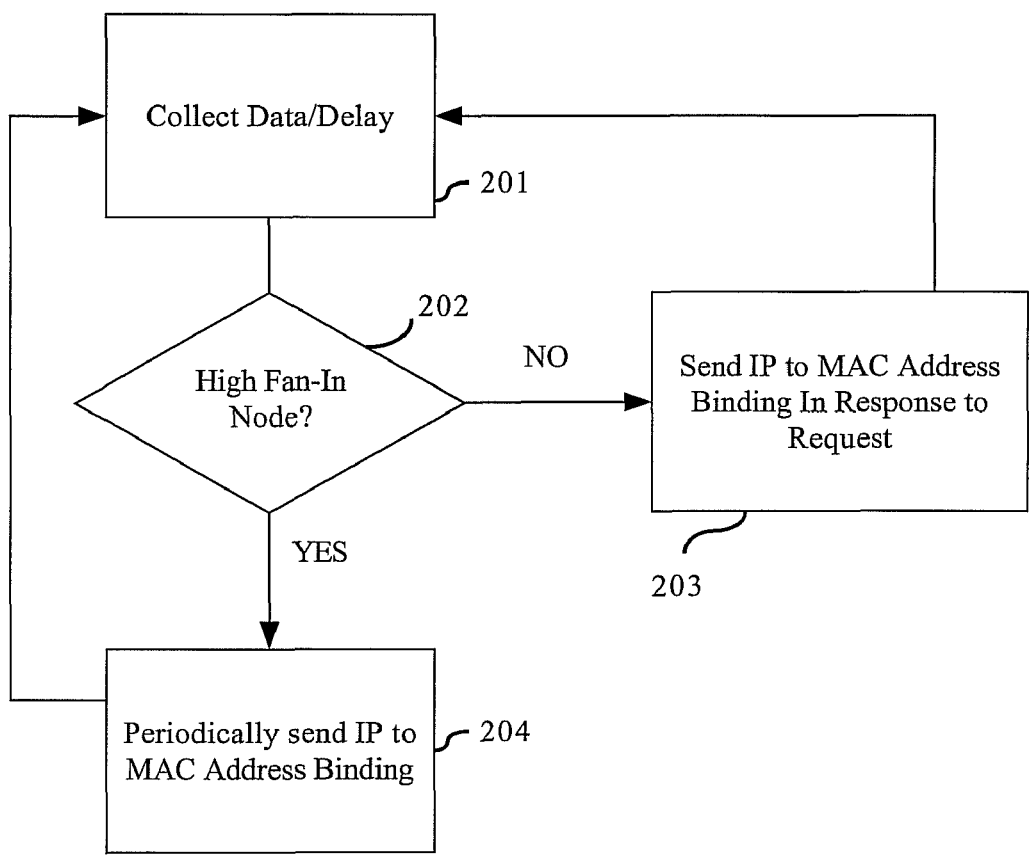
FIG. 2 illustrates a method, according to an embodiment.

FIG. 2 illustrates a method 200 for managing a node with an IP-to-MAC binding, according to an embodiment. The IP-to-MAC binding may be generalized to encompass other types of high level address to low level address bindings. The method 200 is described with respect to FIG. 1 by way of example and not limitation.

At step 201, a node collects data for determining whether it is a high fan-in node. The data is used at step 202 and is described below.

At step 202, the node determines whether it is a high fan-in node based on the collected data. The collected data may include a number of requests the node receives for its IP-to-MAC address binding. For example, if the number of requests exceeds a threshold, then the node determines it is a high fan-in node. If the threshold is not exceeded, then the node determines it is not a high fan-in node. Different examples of the threshold are described in detail above. Also, the node may determine that it is a high fan-in node because it is told it is a high fan-in node. For example, a management node may determine the node is a high fan-in node and send a message to the node to configure itself as a high fan-in node. In another example, a system administrator may manually configure the node as a high fan-in node and the node determines it is a high fan-in node based on its configuration.

At step 204, if the node is determined to be a high fan-in node, the node periodically sends its IP-to-MAC address binding to nodes in a network. The sending may include a broadcast of the IP-to-MAC address binding or some other form of transmitting the binding to nodes that may use the binding, such as multicast. The periodicity is described in detail above.

At step 203, if the node is not determined to be a high fan-in node, then the node sends its IP-to-MAC address binding in response to receiving a request for the binding from another node. For example, the node 110e shown in FIG. 1 may determine that it is not a high fan-in node. The node 110e receives an ARP request from the node 110e for the IP-to-MAC address binding of the node 110e. In response to receiving the request, the switch sends its IP-to-MAC address binding to the node 110e.

For example, after some delay, the method 200 is repeated starting again with step 201. Thus, the node continues to collect data for determining whether it is a high fan-in node, such as data related to a threshold that may be used at step 202. Also, the method 200 is performed by some or all the nodes in the network 100 to determine whether they are a high fan-in node.

Figure 3:
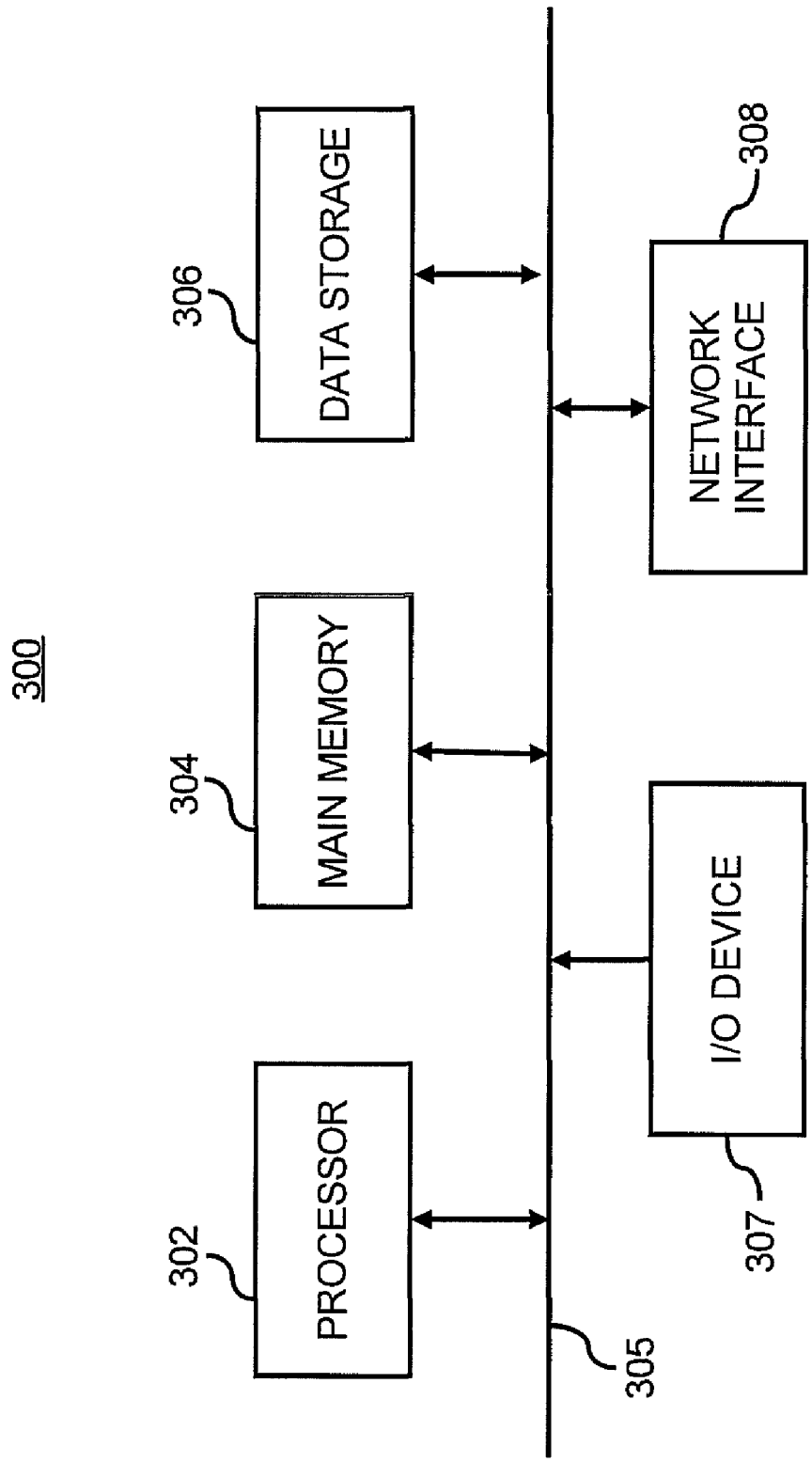
FIG. 3 illustrates a hardware platform for a node, according to an embodiment.

FIG. 3 illustrates an exemplary block diagram of a computer system 300 that may be used as a node in the network described above. The computer system 300 includes one or more processors, such as processor 302, providing an execution platform for executing software. Instead of the computer system being a stand-alone system, the computer system 300 may be provided as a subsystem. For example, the processor 302, data storage and other components may be provided in a network interface card (NIC). The processor may include any circuit configured to perform the functions described herein. The computer system 300 may store and use software that performs one or more of the functions and steps described above. The software may be stored on a computer readable medium, such as the data storage devices described below. The software may exist as software program(s) comprised of program instructions in source code, object code, executable code or other formats for performing the steps and functions described herein.

Commands and data from the processor 302 are communicated over a communication bus 305. The computer system 300 also includes a main memory 303, such as a Random Access Memory (RAM), where software may be resident during runtime, and data storage 306. The data storage 306 may include non-volatile data storage, such as a hard disk drive or a nonvolatile memory where a copy of the software may be stored. The data storage 306 may also include ROM (read only memory), EPROM (erasable, programmable ROM), EEPROM (electrically erasable, programmable ROM). The software and other data may reside in the memory 303 and/or the data storage 306.

The computer system 300 may include one or more I/O devices 307. A network interface 308 is provided for communicating with other nodes in the network.

While the embodiments have been described with reference to examples, those skilled in the art will be able to make various modifications to the described embodiments without departing from the scope of the claimed embodiments.

What is claimed is:

1. A method of proactively sending an IP address to MAC address binding for a high fan-in node, the method comprising:
   determining, by a processor, whether a node is a high fan-in node;
   if the node is determined to be the high fan-in node, proactively and periodically sending the node's IP address to MAC address binding to nodes in a network;
   if the node is not determined to be the high fan-in node, sending the node's IP address to MAC address binding to a first node in the network in response to the node receiving a request for the node's IP address to MAC address binding from the first node;
   determining timeouts for nodes in the network sending the requests for the node's IP address to MAC address binding to the node, wherein each timeout is a period of time the binding is considered valid; and
   determining a periodicity for the periodic sending of the node's IP address to MAC address binding to the nodes in the network based on the timeouts, wherein the periodicity is set to a rate faster than a shortest timeout of the timeouts.

2. The method of claim 1, wherein determining whether a node is a high fan-in node comprises:
   determining whether the node is configured as a high fan-in node.

3. The method of claim 1, wherein determining whether a node is a high fan-in node comprises:
   receiving a message indicating the node is configured as a high fan-in node.

4. The method of claim 1, wherein determining whether a node is a high fan-in node comprises:
   determining whether the node is a high fan-in node based on a number of requests for the node's IP address to MAC address binding.

5. The method of claim 4, wherein determining whether a node is a high fan-in node comprises:
   comparing the number of requests for the node's IP address to MAC address binding received at the node with a threshold; and
   if the threshold is exceeded, determining the node is the high fan-in node.

6. The method of claim 5, wherein the threshold is calculated from a number of nodes in the network.

7. The method of claim 5, wherein the threshold is calculated from a number of nodes in the network sending requests to the node for the node's IP address to MAC address.

8. The method of claim 1, wherein determining a periodicity comprises:
   determining a number of the nodes in the network;
   selecting at least some of the timeouts as outliers, wherein a number of the outliers is based on the number of nodes; and
   calculating the periodicity from the timeouts not including the outliers.

9. The method of claim 8, wherein calculating the periodicity from the timeouts not including the outliers comprises:
   calculating an average from the timeouts not including the outliers; and
   setting the periodicity to the average.

10. The method of claim 1, wherein determining timeouts comprises:
    monitoring requests for the node's IP address to MAC address binding from each of the nodes; and
    estimating the timeouts for each of the nodes based on a rate of receiving requests from each of the nodes.

11. The method of claim 1, further comprising:
    sending at least one message to the nodes in the network indicating a periodicity for the periodic sending of the node's IP address to MAC address binding, wherein each of the nodes is configured to adjust its timeout to be greater than the periodicity.

12. The method of claim 11, wherein each of the nodes is configured to maintain a proactive binding table and a reactive binding table, the proactive binding table including one or more nodes in the network periodically sending its IP address to MAC address binding and the reactive binding table including one or more nodes in the network sending its IP address to MAC address binding in response to receiving a request for the binding.

13. The method of claim 12, wherein the proactive binding table includes a timeout for each node periodically sending its binding, and the reactive binding table includes a timeout for each node in the reactive table.

14. The method of claim 1, wherein a plurality of nodes in the network is determined to be high fan-in nodes and the method comprises:
  each of the plurality of high fan-in nodes sending its IP-to-MAC address binding to other nodes in the network within a periodic time window, and each of the plurality of high fan-in nodes randomly selects a time in the time window to send its binding.

15. The method of claim 1, further comprising at least one of the nodes:
  periodically receiving the IP address to MAC address binding from the node if the node is a high fan-in node;
  determining a periodicity that the node is sending the IP address to MAC address binding; and
  adjusting a timeout in the at least one node to be greater than the periodicity, wherein the timeout is a period of time the binding is considered valid.

16. A node in a network comprising:
  at least one network interface connecting the node to other nodes in the network via a network;
  a data storage device storing a number of received requests for the node's IP address to MAC address binding; and
  a processor configured to:
    determine whether the node is a high fan-in node;
    if the node is determined to be the high fan-in node, proactively and periodically send the node's IP address to MAC address binding to other nodes in a network via the network interface;
    if the node is not determined to be the high fan-in node, send the node's IP address to MAC address binding to a first node in the network in response to the node receiving a request for the node's IP address to MAC address binding from the first node;
    determine timeouts for nodes in the network sending the requests for the node's IP address to MAC address binding to the node, wherein each timeout is a period of time the binding is considered valid; and
    determine a periodicity for the periodic sending of the node's IP address to MAC address binding to the nodes in the network based on the timeouts, wherein the periodicity is set to a rate faster than a shortest timeout of the timeouts.

17. The node of claim 16, wherein the processor determines whether a node is a high fan-in node based on a number of requests received for the node's IP address to MAC address binding or based on a configuration provided to the node.

18. A computer readable storage device storing software that when executed by a processor performs a method of proactively sending an IP address to MAC address binding for a high fan-in node, the method comprising:
  determining, by a processor, whether a node is a high fan-in node;
  if the node is determined to be the high fan-in node, proactively and periodically sending the node's IP address to MAC address binding to nodes in a network;
  if the node is not determined to be the high fan-in node, sending the node's IP address to MAC address binding to a first node in the network in response to the node receiving a request for the node's IP address to MAC address binding from the first node;
  determining timeouts for nodes in the network sending the requests for the node's IP address to MAC address binding to the node, wherein each timeout is a period of time the binding is considered valid; and
  determining a periodicity for the periodic sending of the node's IP address to MAC address binding to the nodes in the network based on the timeouts, wherein the periodicity is set to a rate faster than a shortest timeout of the timeouts.

* * * * *